(12) United States Patent
Bae et al.

(10) Patent No.: US 11,970,071 B2
(45) Date of Patent: Apr. 30, 2024

(54) ELECTRIC VEHICLE CHARGING SYSTEM AND METHOD THEREOF FOR PROVIDING DIAGNOSTIC SERVICES

(71) Applicant: DAEYOUNG CHAEVI CO., LTD., Daegu (KR)

(72) Inventors: Kyung Soo Bae, Suwon-si (KR); Sang Ho Kim, Yongin-si (KR)

(73) Assignee: DAEYOUNG CHAEVI CO., LTD., Daegu (KR)

( * ) Notice: Subject to any disclaimer, the term of this patent is extended or adjusted under 35 U.S.C. 154(b) by 379 days.

(21) Appl. No.: 17/443,182

(22) Filed: Jul. 21, 2021

(65) Prior Publication Data
US 2023/0001810 A1 Jan. 5, 2023

(30) Foreign Application Priority Data
Jun. 30, 2021 (KR) ........................ 10-2021-0086083

(51) Int. Cl.
*B60L 53/18* (2019.01)
*H04B 3/54* (2006.01)

(52) U.S. Cl.
CPC ............... *B60L 53/18* (2019.02); *H04B 3/54* (2013.01); *B60L 2240/72* (2013.01); *H04B 2203/5408* (2013.01); *H04B 2203/5462* (2013.01)

(58) Field of Classification Search
CPC ...... B60L 53/16; B60L 53/18; B60L 2240/72; H04B 2203/5462
See application file for complete search history.

(56) References Cited

FOREIGN PATENT DOCUMENTS

KR 20200032512 A * 3/2020

OTHER PUBLICATIONS

Machine translation of KR 20200032512 A. (Year: 2023).*

* cited by examiner

*Primary Examiner* — David V Henze-Gongola
(74) *Attorney, Agent, or Firm* — BROADVIEW IP LAW, PC

(57) ABSTRACT

The present invention presents a method providing an additional service during electric vehicle charging by (a) the electric vehicle charger (200) detecting connection with an electric vehicle (100) via a charging cable; (b) the electric vehicle charger (200) exchanging charging messages through a charging port in a PLC modem, when the connection is detected in step (a); and (c) the electric vehicle charger (200) providing an additional service for the electric vehicle once the charging begins, and therefore, providing additional services such as software updates, vehicle contents updates requested by a driver during the charging of the electric vehicle, and thus providing convenience for the car owners without visiting car diagnostic service center.

3 Claims, 6 Drawing Sheets

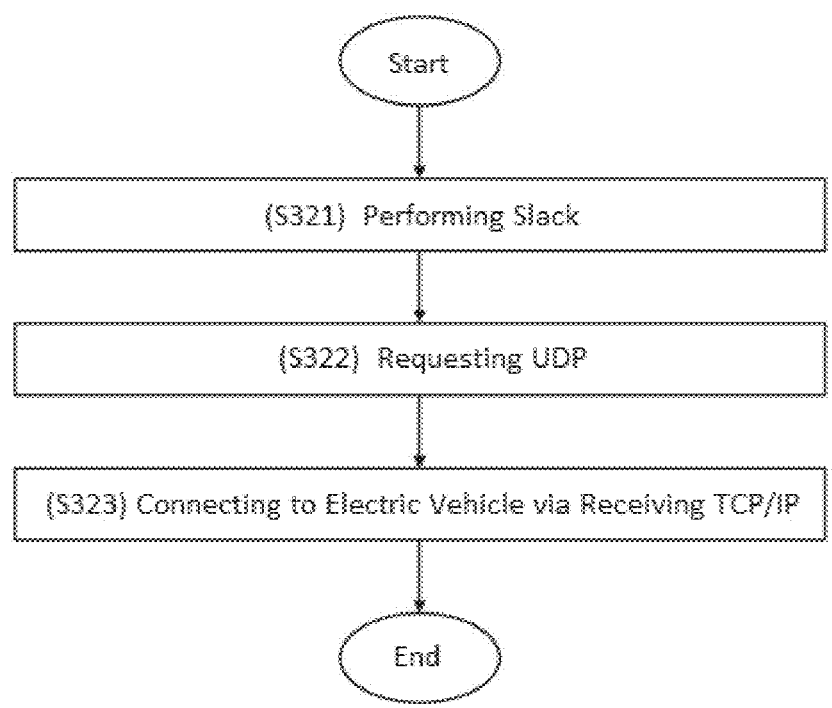

ELECTRIC VEHICLE CHARGING SYSTEM AND METHOD THEREOF FOR PROVIDING DIAGNOSTIC SERVICES

CROSS-REFERENCE TO RELATED APPLICATION

This application claims priority to Korean Patent Application No. 10-2021-0086083 filed Jun. 30, 2021, the contents of which are incorporated herein by reference.

FIELD OF THE INVENTION

The present invention is to provide additional services during charging, and more specifically, providing additional services such as failure diagnosis of the vehicle, the battery status diagnosis, software version information, the contents update of the vehicle, such as additional services that can provide additional services other than vehicle charging it to the electric vehicle charging system.

BACKGROUND OF THE INVENTION

Conventional electric vehicle charging system contains one Translation Control Protocol/Internet Protocol (TCP/IP) port formed between the electric vehicle and sends and receives only the message required for charging through the TCP/IP port.

Conventional electric vehicle charging system as described above has a problem that it is not possible to provide additional services, such as failure diagnosis of the vehicle, battery status diagnosis, software update, or content update of the vehicle.

In particular, the electric vehicles cause inconvenience for the owner to visit the electric vehicle diagnostic companies such as car centers more frequently than any internal combustion engine vehicles, to diagnose the electrical and software portions of the control of the vehicle.

SUMMARY OF THE INVENTION

In order to solve the above problems, the present invention provides an electric vehicle charging system and a method for providing additional services during charging by having an additional service port in the PLC server of the electric vehicle charger in addition to the charging port, so the charger can provide additional services such as software update, contents updates requested by the driver during the charging, so the driver does not need to visit vehicle diagnostic companies separately.

The present invention presents a method providing an additional service during electric vehicle charging by (a) the electric vehicle charger (200) detecting connection with an electric vehicle (100) via a charging cable; (b) the electric vehicle charger (200) exchanging charging messages through a charging port in a PLC modem, when the connection is detected in step (a); and (c) the electric vehicle charger (200) providing an additional service for the electric vehicle once the charging begins, and therefore, providing additional services such as software updates, vehicle contents updates requested by a driver during the charging of the electric vehicle, and thus providing convenience for the car owners without visiting car diagnostic service center.

One embodiment of the present invention provides an electric vehicle charging system and a method for providing additional services during charging by having an additional service port in the PLC server of the electric vehicle charger in addition to the charging port, so the charger can provide additional services such as software update, contents updates requested by the driver during the charging, so the driver does not need to visit vehicle diagnostic companies separately.

In another embodiment of the present invention, the electric vehicle charging system and methods update the content during the charging, it is advantageous that the driver can update the contents without using an SD card to update the large size contents in the car.

In a further embodiment of the present invention, the electric vehicle charging system and method thereof provide additional services via a separate port for the additional services during the charging, so the charger can easily obtain the vehicle information without any additional diagnostic connector.

BRIEF DESCRIPTION OF THE DRAWINGS

FIG. 6 presents a detailed flow chart of the connection step in the method for providing additional services according to the present invention.

DETAILED DESCRIPTION OF THE INVENTION

The present invention can be modified in various ways and different examples. Here, the following specific examples and the enclosed drawings are used to explain some embodiments of the present invention. It should be understood this is not intended to limit the present invention to a particular embodiment, but it should be understood that the following embodiment would include all derivatives, equals, or substitutes included in the thought and scope of the present invention. While describing each drawing, similar references were used for similar components.

Terms such as first, second, A, or B may be used to describe a variety of components, but the components should not be limited by the above terms. The terms are used only for the purpose of distinguishing one component from another.

Hereinafter, with reference to the attached drawings will be described in detail for the electric vehicle charging system and method that can provide additional services according to the present invention.

Figure 1:
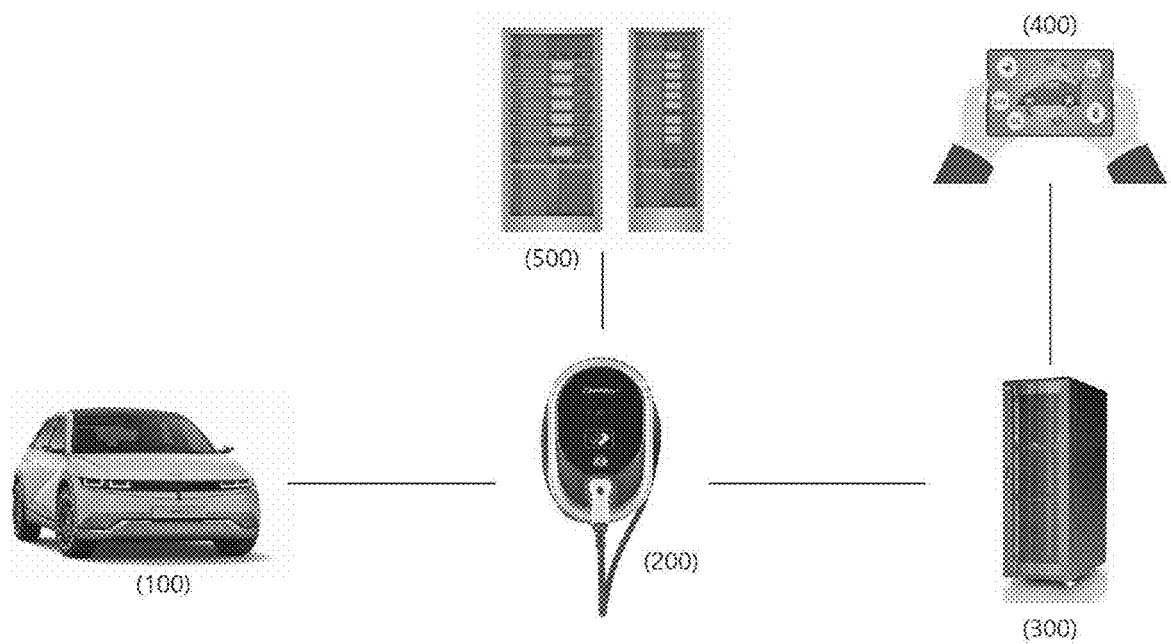
FIG. 1 presents an electric vehicle charging system diagram that can provide additional services according to the present invention.

FIG. 1 is an electric vehicle charging system diagram that can provide additional services according to the present invention.

As shown in FIG. 1, electric vehicle charging system is possible to provide additional services according to the present invention, includes an electric vehicle (100), an electric vehicle charger (200), a back-end server (300), a driver terminal (400), and an electric vehicle manufacturer server (500).

The electric vehicle (100) is a motor vehicle operating by the force of the electricity charged in the chargeable battery loaded in the vehicle.

The electric vehicle charger (200) detects the electric vehicle (100) as it is connected to the electric vehicle (100) via charging cable and at the same time while charging the electric vehicle (100), receives a diagnostic request from the back-end server (300) and diagnoses the state of the electric vehicle (100).

The back-end server (300) is connected to the electric vehicle charger (200) and provides information about the electric vehicle (100) being charged according to a request from the electric vehicle charger (200).

In addition, the back-end server (300) is connected to the driver terminal (400) that is capable of network wireless communication to receive the driver's request through the driver terminal (400).

The driver terminal (400) is connected to the back-end server (300) to receive the various requests from the driver, such as vehicle diagnostics, and as a result, to relay the requests to the electric vehicle charger (200) that is directly connected to the electric vehicle (100).

The driver terminal (400) may be a variety of mobile devices, such as cellphones, tablets, and laptops.

The electric vehicle manufacturer server (500) is connected to the electric vehicle charger (200) or the back-end server (300) through the network to provide basic information of vehicles in various types to store and to be added to the database.

Basic information provided by the electric vehicle manufacturer server (500) includes, but not limited to, the voltage of the battery mounted on the electric vehicle (100), current, or a power that can be charged, information about the battery manufacturer, the version information for various software required for the electric vehicle (100) operation, or vehicle content information and the like.

The software may be mainly software required to operate the vehicle, or software such as a charging device, or an audio device.

Basic information about the electric vehicle provided from the electric vehicle manufacturer server (500) is stored in the back-end server (300) and is provided to the electric vehicle charger (200), or the electric vehicle manufacturer server (500) is connected directly to the electric vehicle charger (200) via network to provide basic information.

Figure 2:
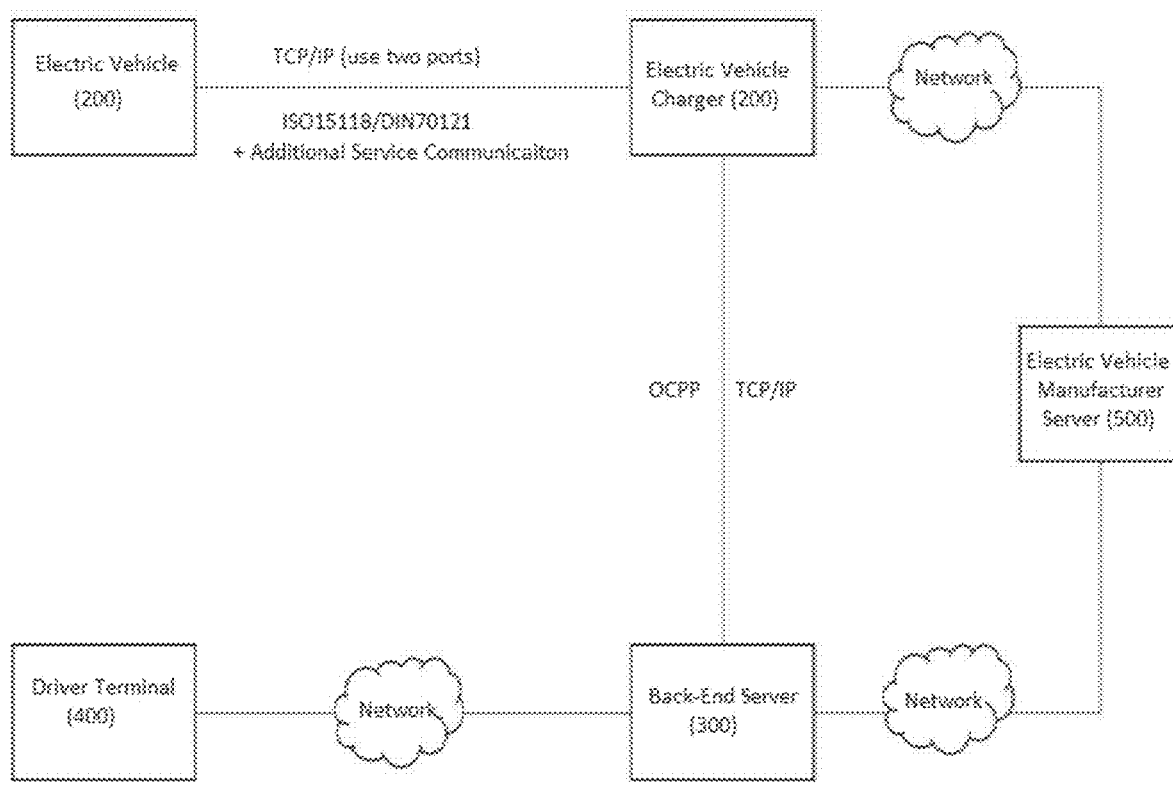
FIG. 2 presents a detailed connection diagram of the electric vehicle charging system that can provide additional services according to the present invention.

Referring to FIG. 2 the electric vehicle charging system of the present invention providing additional services is described in more details.

As shown in FIG. 2, the electric vehicle (100) and the electric vehicle charger (200) is connected to the TCP/IP (Translation Control Protocol/Internet Protocol) port through the charging cable for Power Line Communication (PLC), wherein, unlike the conventional method using a single TCP/IP port, another TCP/IP port is added in the present invention to use two TCP/IP ports.

That is, by adding additional TCP/IP port for the PLC communication, an additional function for exchanging messages for providing additional services is further added in the electric vehicle charger (200).

That is, as the driver or an electric vehicle charging station employee connects the charging cable or charging gun of the electric vehicle charger (200) by inserting into the charging port of the electric vehicle (100), the PLC modem of the electric vehicle charger (200) exchanges messages for charging through one TCP/IP port based on ISO 15118 or DIN 70121 specification for charging.

The ISO 15118 is an international standard and DIN70121 is an European standard, wherein DIN 70121 includes only the DC charging mode, while ISO 15118 includes both AC and DC charging mode.

The ISO 15118 is an international standard for defining the communication between the electric vehicle (100) and the electric vehicle charger (200). In addition, the Plug & Charge (PnC) defines a technique for automatic authentication of the user for using the charging service. PnC is an automatic authentication technology that automatically processes all processes such as electric vehicle user authentication, charging, and billing.

EVCC (Electric Vehicle Communication Controller) of the electric vehicle (100) proceeds to slack to find the PLC modem of the electric vehicle charger (200) through the remaining one TCP/IP port.

The electric car charger (200) confirms the customer/user information for the electric vehicle (100) for charging, based on the customer information stored in advance as the slack progresses.

The electric vehicle charger (200) sends and receives messages about the additional services with the electric vehicle (100) once it is confirmed as an existing customer.

Then, the electric vehicle charger (200) informs the back-end server (300) that it is now connected to the customer's car to the back-end server 300, confirms if the driver has requested a diagnosis of the vehicle, and bring it in if there is a diagnostic request from the driver.

The diagnostic request includes, but not limited to, a malfunction diagnosis of the vehicle, battery status diagnosis, software version information and the like.

The electric vehicle charger (200) receives a diagnostic request received from the back-end server (300), checks the failure diagnosis, battery status diagnosis, software version information, etc. of the vehicle, and generates a diagnostic log for the relevant diagnostic request.

When the electric vehicle charger (200) delivers the diagnostic log generated by itself to the back-end server (300), the back-end server (300) delivers a vehicle status by passing the diagnostic log to the driver terminal (400).

On the other hand, the electric vehicle charger (200) confirms the software version information, and update the version, by using what was downloaded in the back-end server (300) from the electric vehicle manufacturer (500), or by directly connecting to the vehicle manufacturer server (500) to download and update any software needed for the operation of the electric vehicle.

The electric vehicle manufacturer server (500) provides basic information, such as software, mounted battery information, etc. related to the electric vehicle (100) to the back-end server (300) for managing the electric vehicle charger (200), as described above.

Figure 3:
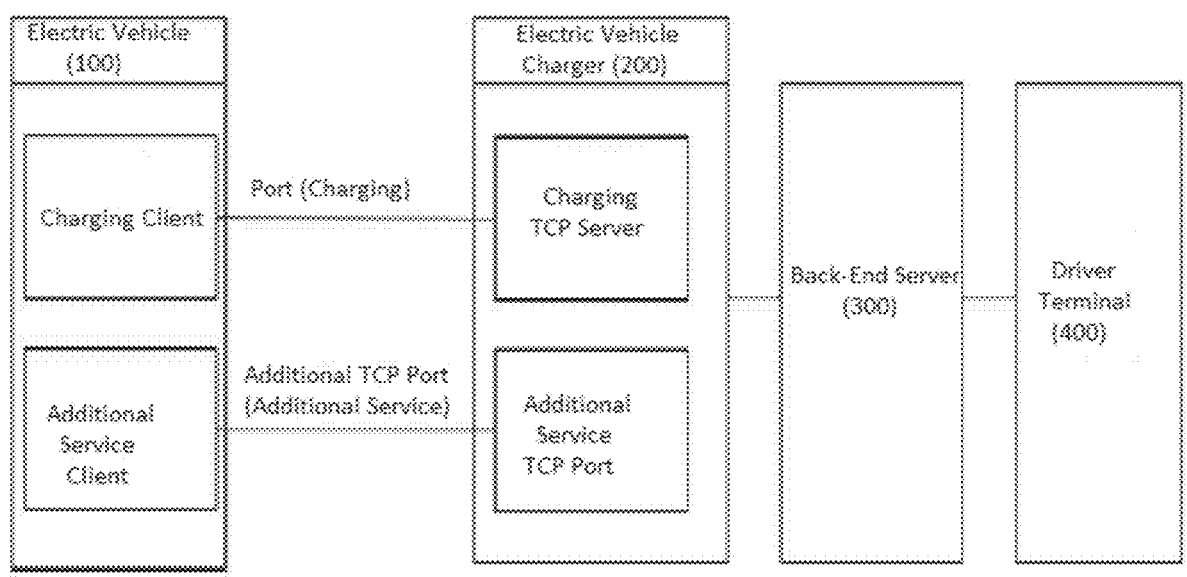
FIG. 3 presents a diagram explaining that an electric vehicle and an electric vehicle charger of the present invention providing additional services are connected via two TCP ports.

FIG. 3 describes the charging method by the electric vehicle charging system that can provide additional services according to the present invention having a configuration as described above.

The owner of the electric vehicle (100) would connect to the back-end server (300) through the driver terminal (400) and go through the steps to register for a membership before using the electric vehicle charger (200) for providing additional services.

In the membership registration step, the owner provides basic personal information such as address, identification number such as social security number, or contact information and car information related to the electric vehicle (100) such as the vehicle model, vehicle identification number, battery specifications, manufacturer, etc. to the back-end server (300) through the driver terminal (400).

First, the driver of the electric vehicle (100) enters the electric vehicle charging station in order to charge the vehicle due to lack of power in the vehicle battery and connects the charging gun of the electric vehicle charger (200) to the charging port of the electric vehicle (100).

That is, the electric vehicle charger (200) performs the step (S100) of detecting the connection with the electric vehicle (100) through the charging cable according to the charging attempt of the driver.

When the electric vehicle charger (200) detects the connection of the electric vehicle (100) in the step S100, it performs the step of charging (S200) the electric vehicle (100).

Figure 4:
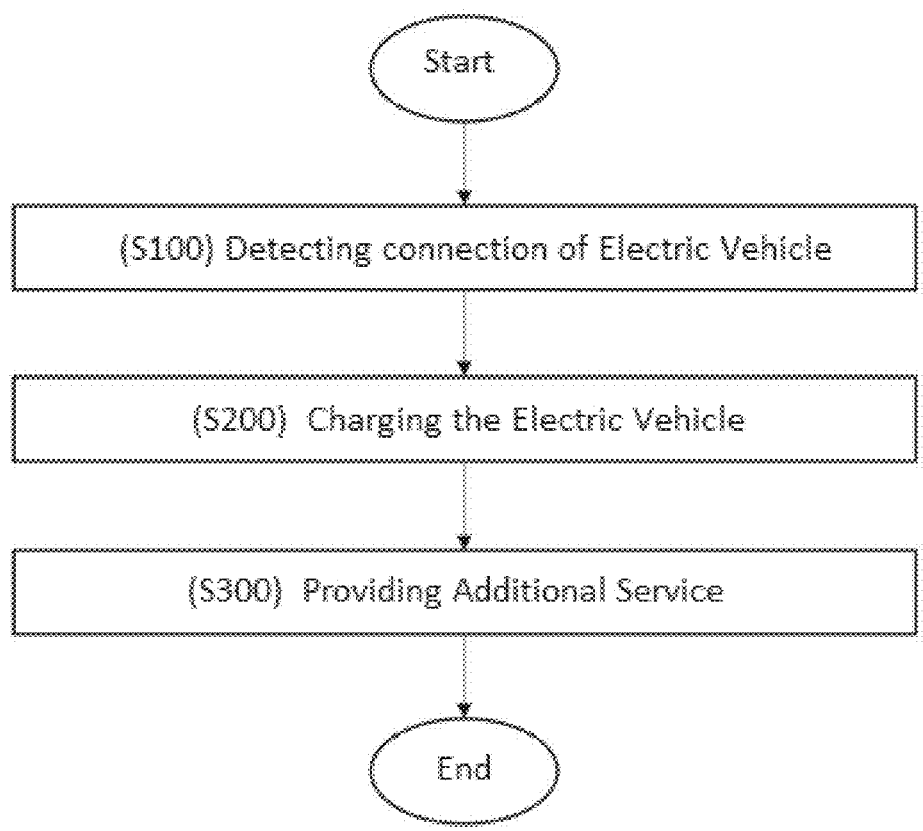
FIG. 4 presents a flow chart of the method of charging an electric vehicle providing additional services according to the present invention.

More specifically, when the electric vehicle charger (200) detects the connection of the electric vehicle (100), as shown in FIG. 4, among the additional service port and the charging port of PLC modem for TCP/1P communication, the charging port is open to communicate with the electric vehicle (100) by ISO15118 or DIN70121 type, to exchange messaged for charging to perform the step of charging the electric vehicle.

Then, the electric vehicle charger (200) performs the step of providing an additional service (S300) for the electric vehicle (100) once the charging of the connected electric vehicle (100) begins.

The S300 step is available while the S200 step is in progress, and if the connection of the charging cable is unexpectedly lost by a fast charge, the electric vehicle charger (200) error-handling information for providing additional services that have not been processed in the step S300, and deletes the error-handled information so that it cannot be used.

Figure 5:
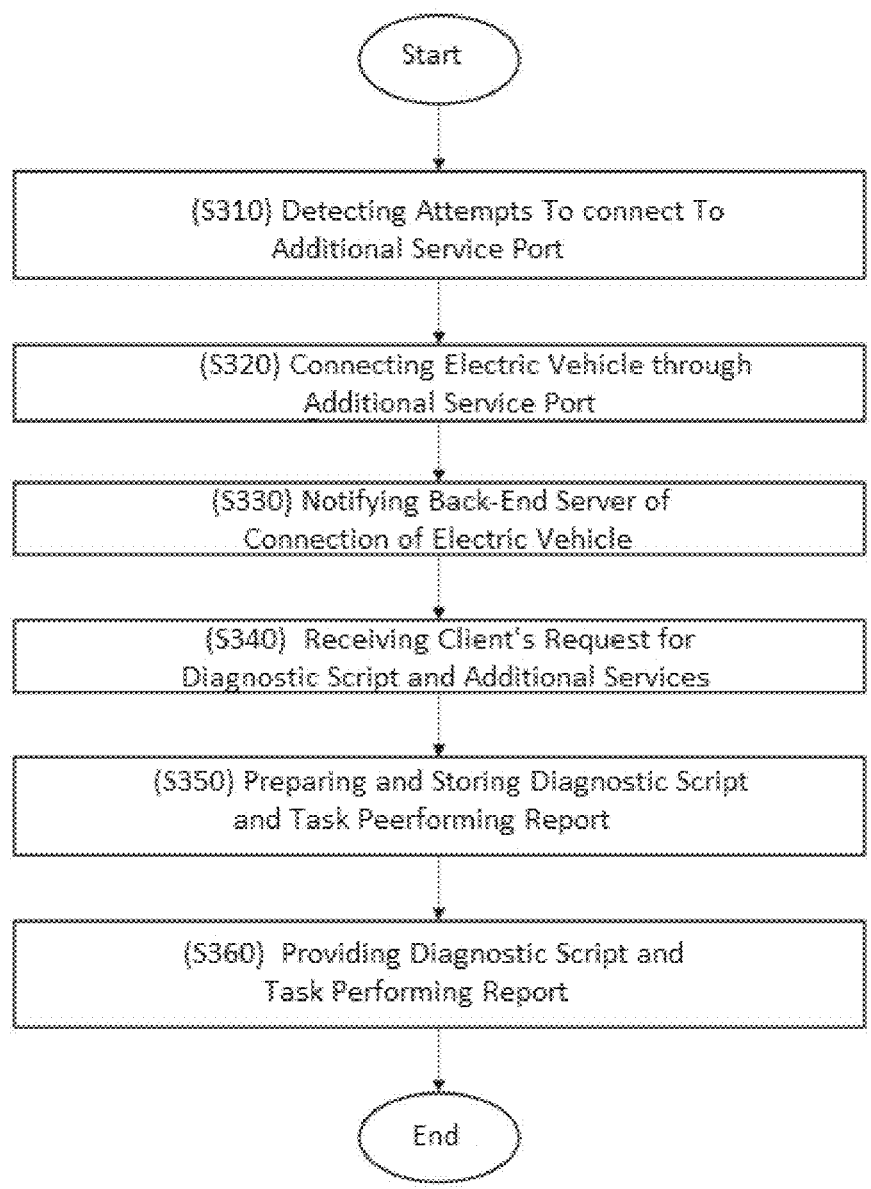
FIG. 5 presents a detailed flow chart of the method providing additional services by the electric vehicle charger according to the present invention.

FIG. 5 provides explanation for the S300 to provide the additional service in more details.

First, the electric vehicle charger (200) begins charging the electric vehicle (100) in the step S200, then detects attempts to connect the additional service port by the electric vehicle (100) and performs the step of detecting it (S310).

The electric vehicle charger (200) performs the step of connecting (S320) with the electric vehicle (100) by opening the additional service port as shown in FIG. 4.

FIG. 6 provides more detailed explanation for step S310. First, the electric vehicle 100 performs the step of performing the slack (S321) to find the PLC modem of the electric vehicle charger (200).

The electric car charger (200) operates as a TCP server when the slack proceeds to acknowledge the electric vehicle (100) as a customer and performs the step of requesting the UDP (S322).

According to the UDP request in the step S312, the electric vehicle (100) transmits the TCP/IP to the electric vehicle charger (200).

The electric car charger (200) receives the TCP/IP from the electric vehicle (100) and performs the step of connecting with the electric vehicle (100) via the TCP/IP (S333).

The electric car charger (200) performs the step of notifying (S330) the connection of the electric vehicle (100) to the back-end server (300) when the connection to the electric vehicle 100 is completed.

The electric vehicle charger (200) performs the step of receiving (S340) the vehicle diagnostic script and the customer's request from the back-end server (300).

The diagnostic script is description of series of the information of the status of the electric vehicle (100) such as, but not limited to, diagnosis of the battery condition of the vehicle, reading of mileage, schedule of battery replacement, diagnosis of the failure of the vehicle, and software version information.

More specifically, unlike the internal combustion engine vehicles, the electric vehicle (100) has many devices that are operated or managed by a software and thus, it is necessary to include the update of the security software in the above diagnostic script.

On the other hand, the driver's request is a software version information check and navigation update of the various devices in the electric vehicle (100), a voice file such as MP3 that can be played in the vehicle or saving a video file such as MP4 in the memory device of the electric vehicle and other updates of software.

The above-described requests can be stored in the back-end server (300) as the driver sends the requests through the driver terminal (400) to be delivered to the electric vehicle charger (200).

The voice files and the video files can be stored in the back-end server (300) through the driver terminal (400) to identify the driver's preference and updated during the charging of the electric vehicle through the additional service port as a part of the additional service provided.

The electric vehicle charger (200) diagnoses the electric vehicle (100) connected to the additional service port according to the received vehicle diagnostic script and collects various information from the electric vehicle (100) to generate a diagnostic log, and performs the step of storing (S350) the generated diagnostic log on the back end server (300).

The electric vehicle charger (200) generates a total requested task performing report by performing any requests received from the driver at step S340 in addition to the basic vehicle diagnostic script service by performing the request together at step S350.

In the step S350, the electric vehicle charger (200) may generate a task performing report based on the requests by the driver, deliver and save the report in the back-end server (300).

The back-end server (300) performs the step of providing (S360) the diagnostic log and the task performing report at the request of the driver.

That is, when the driver installs and runs the electric vehicle charging app that can provide additional services on the driver terminal (400), and requests a diagnostic log and a task performing report, the back-end server (300) performs the steps to provide the log and the report through the network communication.

The purpose of the above description is only to provide some examples of the technical aspects of the present invention, and it is understood that a variety of modifications and derivatization will be possible in the range that does not deviate from the essential characteristics of the present invention for a person of ordinary skill in the art. Thus, the embodiments disclosed in the present invention describes, but not intend to limit the technical aspects of the present invention, the essential scope of the present invention. The scope of protection of the present invention should be interpreted by the following claims, and all technical ideas within the equivalent range will be interpreted to be included in the scope of the invention.

REFERENCE NUMBERS

100: Electric vehicle
200: Electric car charger

300: Back-end server
400: Driver terminal
500: Electric vehicle manufacturer server

The invention claimed is:

1. A method of charging an electric vehicle and providing an additional service by an electric car charger comprising:
  a) detecting a connection between the electric vehicle and the car charger via the charging cable of the electric car charger;
  b) exchanging charging messages between the electric vehicle and the electric car charger through a charging port in a PLC modem, when the connection is detected in step a);
  c) providing an additional service for the electric vehicle once the charging begins;
  (c-1) detecting connection attempts by the electric vehicle via a port for an additional service in PLC modem;
  (c-2) opening the additional service port and connecting to the electric vehicle;
  (c-3) notifying the connection of the electric vehicle to a back-end server when connection to the electric vehicle is completed;
  (c-4) receiving a vehicle diagnostic script from the back-end server and a request for an additional service from a customer;
  (c-5) diagnosing the electric vehicle based on the vehicle diagnostic script, collecting multiple information from the electric vehicle to form a diagnostic log, and saving the diagnostic log in the back end server; and
  (c-6) providing the diagnostic log and a task performing report of the requested additional service from the back end server to a driver terminal.

2. The method of claim 1, wherein step (c-2) comprises:
  (c-2-1) the electric vehicle finding the PLC modem of the electric vehicle charger;
  (c-2-2) the electric vehicle charger operating as a TCP server to detect the electric vehicle as a customer and requesting a UDP after the progressing of slack; and
  (C-2-3) the electric vehicle charger receiving a TCP/IP message from the electric vehicle and connecting with the electric vehicle through TCP/IP.

3. The method of claim 1, wherein the electric vehicle charger receives a request from a driver in step (c-4), performs the request in step (c-5), and generates the task performing report.

* * * * *